United States Patent [19]

Molnar

[11] Patent Number: 5,410,665
[45] Date of Patent: Apr. 25, 1995

[54] PROCESS CONTROLLER SINGLE MEMORY CHIP SHADOWING TECHNIQUE

[75] Inventor: Richard J. Molnar, Willoughby, Ohio

[73] Assignee: Elsag International B.V., Amsterdam Zuidoost, Netherlands

[21] Appl. No.: 259,087

[22] Filed: Jun. 13, 1994

Related U.S. Application Data

[63] Continuation of Ser. No. 859,284, Mar. 26, 1992, abandoned, which is a continuation of Ser. No. 340,985, Apr. 20, 1989, abandoned.

[51] Int. Cl.$^6$ ............................................. G06F 12/00
[52] U.S. Cl. ............................. 395/400; 364/DIG. 1; 364/244; 364/255.1
[58] Field of Search ........................... 395/400, 425

[56] References Cited

U.S. PATENT DOCUMENTS

| | | | |
|---|---|---|---|
| 4,037,211 | 7/1977 | Ikuta et al. | 395/400 |
| 4,475,176 | 10/1984 | Ishii | 395/400 |
| 4,503,491 | 3/1985 | Lushtak et al. | 395/400 |
| 4,755,967 | 7/1988 | Gabris et al. | 364/900 |
| 4,805,092 | 2/1989 | Cerutti | 395/400 |
| 4,926,372 | 5/1990 | Nakagawa | 364/900 |
| 4,985,871 | 1/1991 | Catlin | 365/230.06 |
| 4,987,537 | 1/1991 | Kawata | 364/200 |
| 5,146,581 | 9/1992 | Kaneko | 395/425 |
| 5,301,328 | 4/1994 | Begur et al. | 395/400 |

FOREIGN PATENT DOCUMENTS

| | | |
|---|---|---|
| 0246025 | 11/1987 | European Pat. Off. . |
| 0364458 | 5/1990 | European Pat. Off. . |
| 58-92054 | 6/1983 | Japan . |

OTHER PUBLICATIONS

E.D.N., Electrical Design News, vol. 30, #20, Sep. 1985 pp. 303–304, J. Hardway, "146805 m$\mu$P Adresses an Extra 10K Bytes".
K. Robinson, "Overcoming Addressing Limitations with Page Addressed EPROMS", Electronic Engineering, vol. 58, #711, 1986, pp. 131–134.

Primary Examiner—Rebecca L. Rudolph
Attorney, Agent, or Firm—Michael M. Rickin; Vytas R. Matas; Paul R. Katterle

[57] ABSTRACT

A process and apparatus for shadowing memory uses a single memory chip which is addressable into an address field which is smaller than the memory chip. A program having a main control portion is programmed into a main memory area of the memory chip and is directly connected to a main address space of the address field. The program also includes a plurality of secondary program portions which can be used one at a time with the main control portion of the program. Each of the secondary program portions is stored in a separate secondary and shadowed memory area of the memory chip. A secondary address space of the address field which is large enough to accommodate only one secondary memory area at a time, is controlled so as to be latched to only one secondary memory area at a time. Latching is achieved through higher bits of address locations in a selected portion of the address field. Interrupt and power-up routines are provided in the main portion of the program to avoid entering and leaving the program through different secondary program portions.

9 Claims, 1 Drawing Sheet

PROCESS CONTROLLER SINGLE MEMORY CHIP SHADOWING TECHNIQUE

This is a continuation of application Ser. No. 07/859,284 filed on Mar. 26, 1992 now abandoned, which is a continuation of application Ser. No. 07/340,985 filed Apr. 20, 1989, now abandoned.

FIELD AND BACKGROUND OF THE INVENTION

The present invention relates in general to computer technology, and in particular to a new and useful method and apparatus for utilizing a single memory chip with shadowed memory portions.

Shadowing is a method by which memory expansion can be accomplished without extending the address field.

Often, the directly addressable memory in a memory chip is sufficient to store the controller code for a program that is used to achieve a selected result. An example is the control program for PID control of steam temperature for a boiler. Sometimes, however, the controller requires extra memory for graphics, large look-up tables, additional functionality, or the like. If no more memory is directly addressable, then the rest must be shadowed.

Shadowing is typically done by setting some bits on a port or latch to control the upper address lines of a memory chip. The lower set of address lines remain tied to the address bus. The memory enable is designed to be selected only when the micro-processor address falls within a certain field. This field may be located any where in the available memory address map; however, break points using higher bit states typically dictate the field location in the map. The field width is defined by the number of actual lower memory chip address lines tied directly to the micro-processor address bus. The number of shadowed levels is determined by the number of high address bits that are set by a latch or port. To access different areas of the memory chip, the latched bits must be set to indicate which area is to be accessed.

If all of the memory is shadowed, then special software routines must be written to keep track of which shadow level the program is in and where to go next.

Another way to keep track is to use two or more separate memory chips and sort them into control memory chips and shadowed memory chips. In this way, basic shadowing methods can easily be applied.

The use of one chip, however, does not lend itself well to basic shadowing techniques. The reason for this is that upon power-up or during an interrupt in an industrial process controller, the program can go off track unless special care is taken to keep track of which level it is operating out of when all of the memory is shadowed.

SUMMARY OF THE INVENTION

The present invention is based on the concept that it is better to have a control memory that is not shadowed, in order to control the parts of the memory that are shadowed.

The invention allows this even when both memories are on the same chip. The control memory includes all of the interrupt vectors, interrupt routines, and power-up algorithms that always dominate and manipulate the shadowed memory.

Accordingly, an object of the present invention is to provide a process for shadowing memory using a single memory chip which is addressable into an address field which is smaller than the memory chip, with a program having a main program portion and a plurality of secondary program portions usable with the main program portion, the process comprising: storing the main program portion in a main memory area of the memory chip; storing each of the secondary program portions in a separate shadowed memory area of the memory chip; assigning a main address space of the address field, which is large enough to receive the main memory area, to the main memory area; assigning a single secondary space of the address field which is large enough to receive only one of the shadowed memory areas at a time, to each of the shadowed memory areas; latching one of the secondary memory areas at a time to the secondary address space; and providing interrupt means for interrupting the program in the main program portion so that, regardless of the point in the program which is active during an interruption, interruption will always return to the program from the main memory interrupt portion.

Another object of the present invention is to provide a process and apparatus for establishing and using shadowed memory, which is simple in design and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 2:
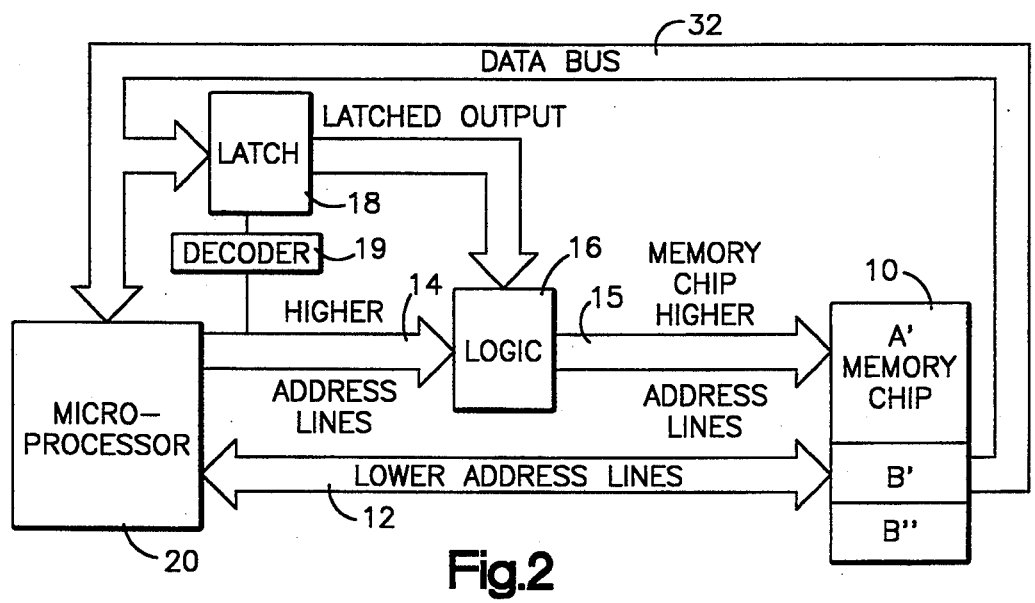
FIG. 2 is a block diagram showing a micro-processor apparatus using the present invention.

FIG. 2 illustrates a micro-processor apparatus which can be used, for example, for a stand alone PID controller for controlling steam temperature from a boiler. The apparatus uses a main program control stored in main memory area A' of a memory chip 10 and a plurality of secondary program portions each stored in a separate secondary shadowed memory area B' and B", of the memory chip 10. The programs in main memory area A' include all interrupt and power-up routines, 11 and 13, respectively, provided therein to avoid entering and leaving the program throughout different secondary program portions. The secondary program portions may for example be thermo-couple look-up tables or subprograms that are needed for the controller.

Micro-processor 20, is connected to memory chip 10 through lower address lines 12 and higher address lines 14, 15 with an intermediate logic means or element 16 located between the lines 14, 15. Higher address lines 14 connect the micro-processor to the logic means 16 while higher address lines 15 connect the logic means 16 to the memory chip 10. Each address location may, for example, be a 16 bit word with 14 low address lines 12 and two higher address lines 14. As an example, memory chip 10 may be an EPROM (erasable programmable read only memory). Even if the single memory chip 10 is substantially larger than the available address field 22 provided by the micro-processor 20, in accordance with the present invention, a shadowing technique can be utilized to access each of the secondary program parts in either memory B' or memory B", as long as these memory areas are accessed one at a time.

Latching means, in the form of a latch 18, is provided in the present invention to operate logic means 16 for operating the high address lines 15 going to memory chip 10. As is well known to those skilled in the art, an address decoder 19 is connected between micro-processor 20 and latch 18. The decoder 19 may, depending upon the address to be decoded, be connected to receive some or all of the higher address lines 14 or to receive all of the higher address lines 14 and some of the lower address lines 12. For ease of illustration the decoder 19 is shown in FIG. 2 as only receiving all of the lines 14.

The program stored in the memory chip 10 yields instructions that are carried over the data bus 32 back to the micro-processor 20. As is shown in FIG. 2, the data bus 32 is also connected to the latch 18.

Figure 1:
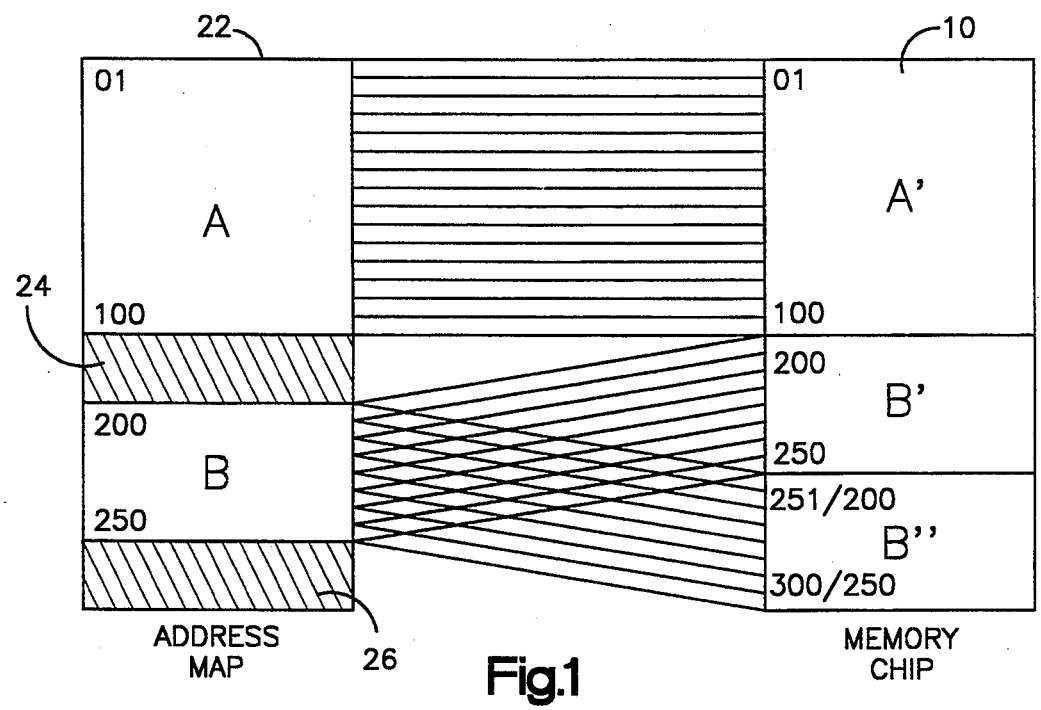
FIG. 1 is a block diagram showing the single memory chip and its address map, used in accordance with the present invention.

FIG. 1 illustrates the situation where the available address space 22 in the address map is not large enough to cover all of the memory locations of the chip because the address map also includes one or more reserved regions which are used for other than addressing the memory chip. From FIG. 1, it can be seen that the memory in A' can fit into address space A; however, only one (either B' or B") memory can use the address space B at any one time. Therefore, B' and B" memory must be shadowed into address space B. A with A' is control memory, and B with B', and B" is shadowed memory. When the controller is powered up or gets an interrupt, the code will be executed from A' memory. Since the interrupt is serviced out of A', it does not matter if the current program was running in A', B', or B". For instance, if the program were running in A' memory and one wants to call a subroutine from B" memory, one would first write the bit code corresponding to setting up B" memory through the data bus 82 to latch 18 (see FIG. 2). This will set up the logic to channel the latched bit code to the memory chip address lines, when the micro-processor address lines to the logic reflect a shadow memory access address.

Now, the micro-processor 20 can immediately jump to the subroutine in B". If while running in this subroutine, one gets an interrupt, the interrupt vector will point to a memory location in A' and is serviced. Recall that A' memory is not shadowed. The micro-processor can return immediately to the memory location where it had left off in the B" subroutine without any shadowing concerns to worry about. When the subroutine in B" finishes, it will return to the A' memory where it was initiated from.

Referring again to FIG. 2, the decoder 19 receives from the micro-processor 20 through the higher address lines 14 the address of the latch 18. Upon decoding that address, the decoder 19 latches the information sent to the latch 18 via bus 32. The contents of the latch 18 remain unchanged until it is desired to address the other shadowed portion of memory, that is, B" if B' was previously addressed or B' if B" was previously addressed.

FIG. 2 shows that the logic 16 has inputs from the latch 18 and micro-processor higher address lines 14. The output of the logic 16 feeds the memory chip higher address lines 15. The invention determines what signal the memory chip address lines will receive based on the state of the micro-processor address lines. The micro-processor address lines will dictate whether there is an access to control memory (address space A in FIG. 1) or shadowed memory (address space B in FIG. 1). From here one can set up combinational logic to perform the following function:

When micro-processor address lines reflect a control memory access, simulate the micro-processor address lines straight through to the memory chip allowing access to area A'. When the micro-processor address lines reflect a shadowed memory access, direct the latched bits to the memory chip higher address lines 15 to allow access to area B' or B". The logic 16 for each separate address line 15 to do this function should be of the following form: [(control memory access address) AND (the micro-processor address line 14)] OR [(not control memory access address) AND (latched shadow location bit 18)]. Each memory chip address line 15 that must be manipulated should have the preceding logic going to it.

Figure 3:
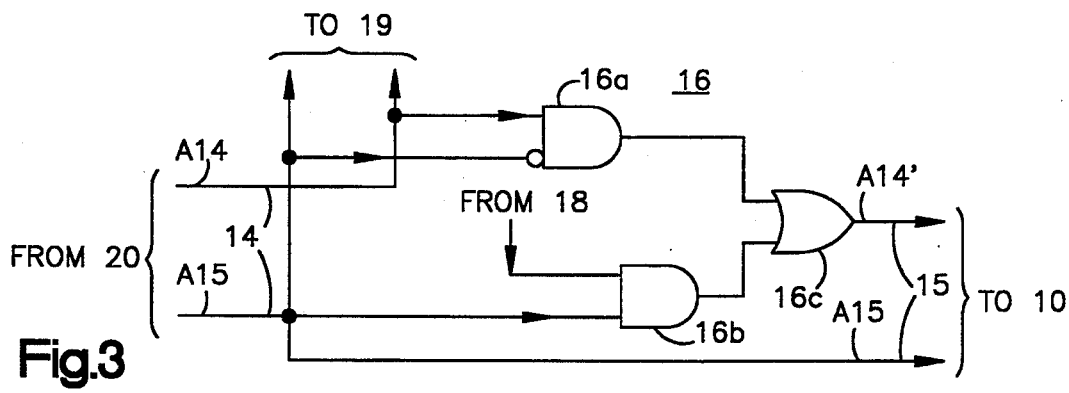
FIG. 3 is a circuit for logic 16 of FIG. 2.

Referring now to FIG. 3, there is shown a circuit for logic 16 embodied in accordance with the description given in the preceding paragraph. The higher order address lines A14 and A15, are connected to logic 16. Specifically, address line A14 is connected to the noninverting input of two input AND gate 16a with address line A15 connected to the inverting input of the gate. Address line A15 and the output of latch 18 are each connected to an associated noninverting input of two input AND gate 16b. The outputs of gates 16a and 16b are connected to OR gate 16c which provides at its output the bit for the higher order address line A14' connected between logic 16 and memory chip 10.

Areas 24 and 26 in address map 22 are reserved areas that are not available to address locations in memory areas B' and B" of the memory chip. Even though the reserved areas 24 and 26 are not available to address locations in B' and B" the present invention allows all of the locations in the memory chip to be addressed (see FIG. 1).

Upon a power-up or any other interrupt, the corresponding interrupt vector will point to an address located in the A memory area and will be completely serviced out of A' memory. At no time will the interrupt routine need to enter shadowed memory B' or B" areas; hence, this does not change the latched bits which are set for either a B' or B" area. Therefore, if the program was running out of B" it will return to B"; if it was running out of B' it will return to B'; if it was running out of A' it will return to A'. There are only two modes that this example can be in. The first is A' memory in A address space and B' memory in B address space. The second way is A' memory in A address space and B" memory in B address space. There is no problem when jumping back and forth between A' and B', A' and B", or A' and A'. The only time that there is a concern is when the jumping is done between B' and B", because the latch must be set differently every time there is access to a different section of the shadowed memory. This is the reason we always return to A' memory before entering a new shadowed section, so that the latch can be set up to enter the newly desired shadowed section before actually entering it. An interrupt that is serviced out of A' will never require B' to B" jumping, it will always be between (A') and (B', B" or A') which is fine.

The present invention has many advantages. First, there is no need for special subroutines or bookkeeping to maintain control over the shadowing. Second, a larger single memory chip can be used to replace many memory chips and still maintain shadowing capability. This will save costs and, in addition, save board space. Also, it offers flexibility to the software by having control over subroutines running out of shadowed memory. For instance, subroutines may be called back and forth between control memory and the selected shadowed memory as if they were both hooked up direct to the address bus. Control will be maintained as long as the control memory initiates the call and is returned to at the end; hence, there is less chance of software bugs due to the shadowing.

This invention can be used in many memory applications. Practically any memory chip size may be used. The number of shadowed levels may be increased or decreased depending on the available addressing, allowable complexity of logic to be used, and memory size. The invention can apply to many types of memory such as RAM or EPROM, Bipolar or CMOS, and so on.

While a specific embodiment of the invention has been shown and described in detail to illustrate the application of the principles of the invention, it will be understood that the invention may be embodied otherwise without departing from such principles.

What is claimed is:

1. A method for shadowing memory using a single memory chip which is addressed by a processing device, said memory chip having a multiplicity of memory locations and two or more memory portions each associated with a predetermined number of said memory chip locations and a program having instructions therein for operating said processing device and addressing said memory chip locations, Said memory chip including a main control program portion wherein said addressing instructions are located and one or more secondary program portions which are accessed one at a time as needed by said main control program portion, said main control program portion and each of said one or more secondary program portions stored in an associated one of said two or more memory portions, said method comprising the steps of:

generating at said processing device from said addressing instructions an address having first and second predetermined portions each of said portions having information therein for addressing only one of said two or more memory portions at a time;

storing in a means external to both said processing device and said single memory chip information from said addressing instructions which provides an indication of which one of said memory portions is to be addressed if said addressed memory portion is one of said one or more secondary program portions;

changing said stored memory portion to be addressed indication information only when said processing device is to address another one of said one or more secondary program portions;

receiving at said external means said first predetermined portion of said processing device generated address;

modifying said information in said received first predetermined portion of said processing device generated address when said received first predetermined portion of said processing device generated address is for addressing one of said one or more secondary program portions by using only in said external means said stored memory portion to be addressed indication information; and using said modified information in said received first predetermined portion of said processing device generated address in combination with said information in said second predetermined portion of said processing device generated address to address one of said one or more secondary program portions.

2. The method of claim 1 wherein said multiplicity of main memory locations are a predetermined number, said method generating at said processing device from said addressing instructions an address having as many bits as are necessary to address all of said predetermined number of said main memory locations.

3. The method of claim 2 wherein said processing device generated address is divided into a first group and a second group each having a predetermined number of said necessary bits, said method receiving at said external means said first group predetermined number of bits and using in said external means said stored memory portion to be addressed indication information to modify one or more of said received first group predetermined number of bits of said processing device generated address when said received first group predetermined number of bits of said processing device generated address is for addressing one of said one or more secondary program portions.

4. An apparatus for shadowing memory using a single memory chip which is addressed by a processing device, said memory chip having a multiplicity of memory locations and two or more memory portions each associated with a predetermined number of said memory chip locations and a program having instructions therein for operating said processing device and addressing said memory chip locations, said memory chip including a main control program portion wherein said addressing instructions are located and one or more secondary program portions which are accessed one at a time as needed by said main control program portion, said main control program portion and each of said one or more secondary program portions stored in an associated one of said multiplicity of memory portions, said processing device generating from said addressing instructions an address having first and second predetermined portions each of said portions having information therein for addressing only one of said two or more memory portions at a time, said apparatus comprising:

means external to both said processing device and said single memory chip for storing from said addressing instructions information which provides an indication of which one of said memory portions is to be addressed if said addressed memory portion is one of said one or more secondary program portions;

said external means including:

means for changing said stored memory portion to be addressed indication information only when said processing device is to address another one of said one or more secondary program portions;

means for receiving said first predetermined portion of said processing device generated address; and means for modifying, by using said stored memory portion to be addressed indication information, said information in said received first predetermined portion of said processing device generated address when said received first predetermined portion of said processing device generated address is for addressing one of said one or more secondary program portions;

wherein said modified information in said received first predetermined portion of said processing device generated address is used in combination with said information in said second predetermined portion of said processing device generated address to address one of said one or more secondary program portions.

5. The apparatus of claim 4 wherein said multiplicity of main memory locations are a predetermined number, said apparatus generating at said processing device from said addressing instructions an address having as many bits as are necessary to address all of said predetermined number of said main memory locations.

6. The apparatus of claim 5 wherein said processing device generated address is divided into a first group and a second group each having a predetermined number of said necessary bits, said external means receiving means receiving said first group predetermined number of bits and said external means using means using in said external means said stored memory portion to be addressed indication information to modify one or more of said received first group predetermined number of bits of said processing device generated address when said received first group predetermined number of bits of said processing device generated address is for addressing one of said one or more secondary program portions.

7. An apparatus for shadowing memory from a processing device comprising:

a single memory chip which is addressed by said processing device, said memory chip having a multiplicity of memory locations and two or more memory portions each associated with a predetermined number of said memory chip locations and a program having instructions therein for operating said processing device and addressing said memory chip locations, said memory chip including a main control program portion wherein said addressing instructions are located and one or more secondary program portions which are accessed one at a time as needed by said main control program portion, said main control program portion and each of said plurality of secondary program portions stored in an associated one of said two or more memory portions, said processing device generating from said addressing instructions an address having first and second predetermined portions each of said portions having information therein for addressing only one of said two or more memory portions at a time;

means external to both said processing device and said single memory chip for storing from said addressing instructions information providing an indication of which one of said two or more memory portions is to be addressed if said addressed memory portion is one of said one or more secondary program portions;

said external means including:

means for changing said stored memory portion to be addressed indication information only when said processing device is to address another one of said one or more secondary program portions;

means for receiving said first predetermined portion of said processing device generated address; and means for modifying, by using said stored memory portion to be addressed indication information, said information in said received first predetermined portion of said processing device generated address when said received first predetermined portion of said processing device generated address is for addressing one of said one or more secondary program portions;

whereby said modified information in said received first predetermined portion of said processing device generated address is used in combination with said information in said second predetermined portion of said processing device generated address to address one of said one or more secondary program portions.

8. The apparatus of claim 7 wherein said multiplicity of main memory locations are a predetermined number, said apparatus generating at said processing device from said addressing instructions an address having as many bits as are necessary to address all of said predetermined number of said main memory locations.

9. The apparatus of claim 6 wherein said processing device generated address is divided into a first group and a second group each having a predetermined number of said necessary bits, said external means receiving means receiving said first group predetermined number of bits and said external means using means using in said external means said stored memory portion to be addressed indication informationb to modify one or more of said received first group predetermined number of bits of said processing device generated address when said received first group predetermined number of bits of said processing device generated address is for addressing one of said one or more secondary program portions.

* * * * *